Figure 1:
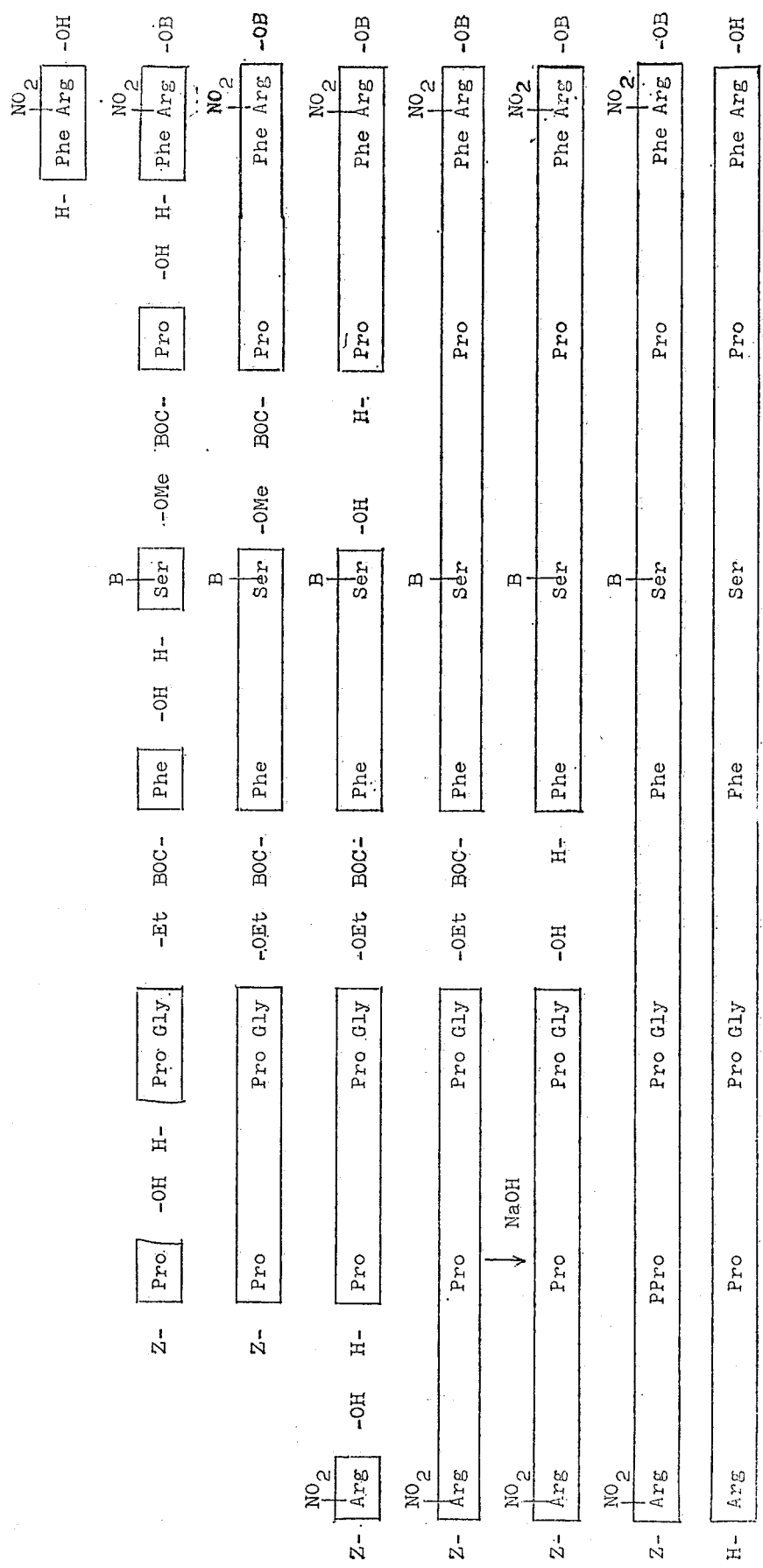

3,247,181
POLYPEPTIDE DERIVATIVES AND ESTERS
THEREOF
Robert Schwyzer, Riehen, Heini Kappeler, Birsfelden, Bernhard Riniker, Reinach, Basel-Land, Werner Rittel and Peter Sieber, Basel, and Herbert Zuber, Riehen, Switzerland, assignors to Ciba Corporation, a corporation of Delaware
No Drawing. Filed Aug. 28, 1961, Ser. No. 134,135
Claims priority, application Switzerland, Sept. 1, 1960, 9,878/60
6 Claims. (Cl. 260—112.5)

The present invention provides a nonapeptide having bradykinin action and corresponding to the formula L-arginyl-L-prolyl-L-prolyl-glycyl-L-phenylalanyl - L - seryl-L-prolyl-L-phenylalanyl-L-arginine, its derivatives and acid addition salts and a process for the manufacture of these compounds.

Bradykinin is a polypeptide of hypotensive action. The abovementioned nonapeptide, its derivatives and salts are suitable for use as medicaments or as intermediates for the manufacture of medicaments containing a longer chain of amino acids embracing the abovementioned peptide.

The abovementioned nonapeptide is obtained when a nitro-L-arginyl-L-prolyl-L-prolyl-glycine containing a protected amino group is condensed with an L-phenylalanyl-L-seryl-L-prolyl-L-phenylalanyl-nitro - L - arginine ester, whose β-hydroxy group is protected, in the presence of a condensing agent, and in the resulting nonapeptide the amino groups of the arginine and the hydroxy group of serine are liberated and the ester group hydrolysed.

The free α-amino group is protected by the known protective groups, for instance the tosyl or trityl group, and more especially the tertiary butyloxycarbonyl group, the carbobenzoxy group or colored protective groups such as arylazo-benzyloxycarbonyl groups, for instance the para-phenylazo-benzyloxycarbonyl group and the para-(para'-methoxyphenylazo-benzyloxycarbonyl group; the β-hydroxy group of serine is preferably protected by an unsubstituted or substituted benzyl group, for instance the para-nitrobenzyl group or the para-chlorobenzyl group. Esters are above all lower alkyl esters, for instance methyl, ethyl, propyl, butyl esters, and also benzyl esters, for instance unsubstituted benzyl ester and para-nitrobenzyl ester.

In a preferred feature carbobenzoxy-nitro-L-arginine is condensed with L-prolyl-L-prolyl-glycine ethyl ester (prepared by condensing carbobenzoxy-L-proline with L-prolyl-glycine ethyl ester and eliminating the carbobenzoxy group by hydrogenolysis) in the presence of dicyclohexylcarbodiimide to yield the tetrapeptide ester, eliminating the ester group under alkaline conditions and condensing the tetrapeptide derivative in the presence of dicyclohexylcarbodiimide with the benzyl ester of the pentapeptide-L-phenylalanyl-β-benzyl-L-seryl - L - prolyl - L-phenylalanyl-nitro-L-arginine (obtained by condensing the L-phenylalanyl-nitro-L-arginine benzyl ester in the presence of dicyclohexylcarbodiimide with tertiary butyl-oxy-carbonyl-L-proline to yield the tripeptide derivative), eliminating the tertiary butyloxycarbonyl group with hydrochloric acid in ethyl acetate solution and condensing the resulting L-prolyl-L-phenylalanyl-nitro - L - arginine benzyl ester with tertiary butyloxy-L-phenylalanyl-β-benzyl-L-serine (obtained by condensing tertiary butyl-oxy-L-phenyl-alanine with β-benzyl-L-serine methyl ester in the presence of dicyclohexyl carbodiimide and subjecting the ester group to alkaline hydrolysis) and finally, if desired, converting the carbobenzoxy-nitro-L-arginyl-L-prolyl-L-prolyl-glycil-L-phenylalanyl-β-benzyl - seryl - L - prolyl-L-phenylalanyl-nitro-L-arganine benzyl ester by catalytic hydrogenation to the free nonapeptide as shown in the scheme Fig. 1. Z represents a carbobenzoxy group, BOC a tertiary butyloxycarbonyl group and B the benzyl radical.

Depending on the reaction conditions used the new compound is obtained in the form of the base or of a salt thereof. From the salts the base can be prepared in as such known manner. From the latter, by reaction with acids suitable for forming therapeutically useful salts, there can be formed salts such, for example, as those with inorganic acids such as hydrohalic acids, for example hydrochloric or hydrobromic acid, nitric acid, thiocyanic, sulfuric, phosphoric acid, or with organic acids such as acetic, propionic, glycollic, lactic, pyruvic, oxalic, malonic, succinic, maleic, fumaric, tartaric, citric, benzoic, cinnamic, salicylic, 2-phenoxylbenzoic, 2-acetoxybenzoic, mandelic, methanesulfonic, ethanesulfonic, hydroxy-ethanesulfonic, benzenesulfonic or toluenesulfonic acid.

The nonapeptide obtained by the present process may be applied in the form of pharmaceutical preparations which contain the peptide in admixture with a pharmaceutical organic or inorganic excipient suitable for enteral or parenteral administration. Suitable excipients are substances that do not react with the polypeptide such, for example, as gelatine, lactose, glucose, sodium chloride, starch, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees, powders, ointments, creams or suppositories, or in liquid form solutions, suspensions or emulsions. They may be sterilized and/or may contain assistants, such as preserving, stabilizing, wetting or emulsifying agents. They may also contain further therapeutically valuable substances.

The following examples illustrate the invention.

The following systems were used for the paper chromatographic examination:

*System 45.*—Secondary butanol:3% ammonia=100:44

*System 54.*—Secondary butanol : isopropanol : monochloracetic acid:water=70 cc.:10 cc.:3 g.:40 cc.

*System 56.*—Secondary butanol:5% veronal sodium: water:isopropanol=100:10:60:15.

EXAMPLE 1

*Carbobenzyloxy-L-prolyl-L-proyly-glycine ethyl ester*

A solution of 10.3 grams of L-prolyl-glycine ethyl ester and 14.1 grams of carbobenzyloxy-L-proline in 100 cc. of acetonitrile is cooled to −15° C. and mixed with 12.7 grams of dicyclohexylcarbodiimide. After 30 minutes at −15° C. and 20 hours at 2° C. the precipitated dicyclohexyl urea (12.85 grams=99% of theory) is suctioned off, the filtrate is concentrated and the residue dissolved in ethyl acetate and then washed until neutral in the usual manner. The ethyl acetate solution is dried with sodium sulfate and evaporated and the oily crude product (21 grams) is purified by repeated trituration with petroleum ether, then dissolved in a small amount of ether and precipitated with a large amount of petroleum ether, to yield 19.4 grams of tripeptide derivative in the form of an oil. After the carbenzoxy and the ester group have been eliminated with concentrated hydrochloric acid (90 minutes at 40° C.) the product displays a main spot with yellow ninhydrin reaction and traces of a by-product. It is sufficiently pure for the following reaction.

EXAMPLE 2

*L-prolyl-L-prolyl-glycine ethyl ester*

A solution of 4.42 grams of carbobenzyloxy-L-prolyl-L-prolyl-glycine ethyl ester in 50 cc. of absolute alcohol is hydrogenated in the presence of palladium carbon (10% Pd), the carbon dioxide resulting from the hydrogenation being absorbed in a second hydrogenation vessel filled with sodium hydroxide solution. After slightly more than the calculated amount of hydrogen has been absorbed, the hydrogenation comes to a standstill. The catalyst is then suctioned off, the filtrate evaporated and the residue (colorless oil) is dried in a high vacuum until its weight remains constant. The resulting tripeptide ester is unitary according to its paper chromatographic examination and is further reacted without having been purified.

EXAMPLE 3

*Carbobenzyloxy-nitro-L-arginyl-L-prolyl-L-prolyl-glycine ethyl ester*

A solution of 2.66 grams of L-prolyl-L-prolyl-glycine ethyl ester in 100 cc. of acetonitrile is cooled to −15° C. and 3.26 grams of carbobenzyloxy-nitro-L-arginine as well as 2.09 grams of dicyclohexylcarbodiimide are added. After 30 minutes at −15° and 2 days at 2° C. the precipitated dicyclohexyl urea is suctioned off, the filtrate evaporated, the residue dissolved in ethyl acetate, and the ethyl acetate solution is washed with dilute hydrochloric acid, water, sodium bicarbonate solution and water. The solution is dried with sodium sulfate and evaporated to yield 4.96 grams of a neutral compound, the crude tetrapeptide derivative, in the form of a resin. For purification the crude product is dissolved in acetone and precipitated with ether. After two reprecipitations the pure tetrapeptide derivative is obtained as a powder melting at 80 to 100° C. After elimination of the carbobenzyloxy and the ester group with concentrated hydrochloric acid (90 minutes at 40° C.) the product is found to be unitary in paper chromatography.

EXAMPLE 4

*Carbobenzyloxy-nitro-L-arginyl-L-prolyl-L-prolyl glycine*

A solution of 2.68 grams of the tetrapeptide derivative obtained in Example 3 in 25 cc. of methanol is cooled to 5° C. and 5 cc. of N-sodium hydroxide solution are added. The clear solution is kept for 2 hours at 5° C. and then neutralized by adding a small amount of solid carbon dioxide. A large amount of water is then added and the methanol evaporated in vacuo, whereupon a small amount of smeary matter settles out. The aqueous phase is then acidified with hydrochloric acid, the percipitate is taken up in a large amount of chloroform and the solution whereupon strong emulsions form; the latter are separated by centifugation, the ammonia solutions are combined and acidified with dilute hydrochloric acid. The precipitated tetrapeptide derivative is taken up in chloroform; after having been washed with a small amount of water, dried with sodium sulfide and evaporated the chloroform solutions yield 2.24 grams of resin (crude tetrapeptide derivative). To purify the product it is dissolved in a small amount of acetone and precipitated with a large amount of ether. The product is a fine powder melting at 113 to 155° C. and is sufficiently pure for further reactions.

Analysis ($C_{26}H_{36}O_9N_8$): Molecular weight=604.64. Calculated: N=18.53%. Found: N=18.23%.

Equivalent weight found by alkaline tetration=589. After the carbobenzyloxy group has been eliminated from it with concentrated hydrochloric acid (90 minutes at 40° C.), the product is found to be unitary in paperchromatography and is identical with the hydrolysate of the ethyl ester described in Example 3.

EXAMPLE 5

*L-phenylalanyl-nitro-L-arginine benzyl ester hydrochloride*

3 grams (7.8 mmols) of L-phenylalanyl-nitro-L-agrinine are dried over phosphorus pentoxide, finely comminuted and suspended with stirring in 60 cc. of freshly distilled benzyl alcohol. While stirring and cooling with ice, dry hydrogen chloride gas is then introduced until saturation has been achieved, during which the dipeptide dissolves completely. The reaction mixture is evaporated twice with 20 cc. of absolute benzene on each occasion, initially in a water-jet vacuum and towards the end in a high vacuum, to a small volume. To complete the esterification the whole procedure is repeated with 60 cc. of benzyl alcohol, and the reaction mixture is again evaporated twice with absolute benzene until a syrupy residue has been obtained. When the residue is disintegrated with absolute ether, the hydrochloride of the dipeptide ester crystallizes out. The crystals are filtered off, thoroughly washed with absolute ether and dried in vacuo over phosphorus pentoxide.

Yield 3.68 grams=95.5% of theory. M.P. 185–186° C.

In the paperchromatogram, in systems 54 and 56, the dipeptide benzyl ester displays only one spot positive to ninhydrin; $R_f$-values: in system 54=0.77 and in system 56=0.67.

EXAMPLE 6

*Tertiary butyloxycarbonyl-L-prolyl-L-phenylalanyl-nitro-L-arginyl benzyl ester*

A solution of 3.50 grams (7.1 mmols) of L-phenylalanyl-nitro-L-arginyl-benzyl ester hydrochloride in a small amount of absolute methanol is treated at 0° C. with a solution of 164 mg. (7.1 mmols) of sodium in 5 cc. of absolute methanol. Two additions of acetonitrile and evaporation to dryness yield a mixture of the free dipeptide ester and sodium chloride which is reacted in 30 cc. of acetonitrile at 0° C. with 2.29 grams (10.65 mmols) of BOC-L-proline and 2.34 grams (11.35 mmols) of dicyclohexyl-carbodiimide. The mixture is kept for 30 minutes at 0° C. and then overnight at 20° C., again cooled at 0° C. and the solid residue (mixture of sodium chloride and dicyclohexyl urea) is filtered off. The filtrate is concentrated to a small volume, diluted with ethyl acetate, washed at 0° C. with sodium carbonate solution, dilute hydrochloric acid and water, dried with sodium sulfate and evaporated. Three reprecipitations of the resulting crude product from ethyl acetate+petroleum ether yield 3.59 grams of pure, protected tripeptide (=77% of theory) as an amorphous powder melting at about 75 to 90° C. $R_f$-values after one hour's hydrolysis with concentrated hydrochloric acid at 40° C.: in system 45=0.49 and in system 54=0.67.

EXAMPLE 7

*L-propyl-L-phenylalnyl-L-nitroarginyl-benzyl ester*

A solution of 3.57 grams (5.47 mmols) of tertiary butyloxycarbonyl - L - propyl - L - phenylalanyl - L - nitroarginylbenzyl ester in 20 cc. of ethyl acetate is treated with 40 cc. of 3.8 N-hydrochloric acid in ethyl acetate. After 30 seconds a smeary precipitate forms. The reaction mixture is kept for 30 minutes at room temperature, evaporated to half its volume and the reaction product is precipitated with petroleum ether at 0° C. in the form of a white amorphous powder. The mixture is filtered and the filter residue is dried at room temperature over potassium hydroxide to yield 3.45 grams of tripeptide benzyl ester dihydrochloride; the latter is dissolved in 30 cc. of water, extracted twice with 60 cc. of ethyl acetate on each occasion and the organic phase is discarded. The aqueous solution is cooled to 0° C., alkalinized with sodium carbonate solution and twice extracted with n-butanol. The butanol extract is washed until neutral and evaporated to dryness, to yield 2.9 grams of a crude product which is purified by being reprecipitated twice from ethyl acetate+petroleum ether. The pure product is obtained in a yield of 2.58 grams (=85% of theory) and displays in system 54 after one hour's hydrolysis at 40° C. with concentrated hydrochloric acid a unitary spot of $R_f$=0.69.

EXAMPLE 8

*Tertiary butyloxycarbonyl-L-phenylalanyl-O-benzyl-L-serine methyl ester*

A solution of 6.75 grams (25.5 mmols) of tertiary butyloxycarbonyl - L - phenylalanine, 3.8 grams (18.2 mmols) of O-benzyl-L-serine methyl ester and 5.62 grams (27.3 mmols) of dicyclohexyl carbodiimide in 40 cc. of acetonitrile prepared at 0° C. is kept for 8 hours at 0° C. and for 14 hours at 20° C. and the dicyclohexyl urea formed is then filtered off at 0° C. The filtrate is concentrated to dryness, taken up in ethyl acetate, washed at 0° C. with dilute hydrochloric acid, sodium carbonate solution and water, dried with sodium sulfate and concentrated to 40 cc. By adding 600 cc. of petroleum ether the protected dipeptide is precipitated in the form of a gel which is filtered at 0° C., washed with petroleum ether and dried at 45° C. in a high vacuum, to yield 6.6 grams (=79% of theory) of a white powder melting at 70–72° C. After one hour's hydrolysis at 40° C. with concentrated hydrochloric acid the compound reveals the following $R_f$-values: in system 45–0.43, in system 54–0.62.

O-benzyl-L-serine methyl ester used as starting material can be prepared as follows:

A solution of 9.0 grams of O-benzyl-D:L-serine methyl ester hydrochloride in 9 cc. of water is covered with 90 cc. of ethyl acetate, cooled to 0° C. and alkalinized with 9 cc. of saturated potassium carbonate solution. The aqueous solution is then extracted twice with ethyl acetate, the combined ethyl ester extracts are washed with saturated sodium chloride solution until they are neutral and then dried over sodium sulfate. The sodium sulfate is filtered off, a solution of 5.5 grams of D-tartaric acid in methanol is added and the whole is evaporated in vacuo. The residue is dissolved in boiling ethanol, inoculated with O-benzyl-L-serine methyl ester D-tartrate and allowed to crystallize at room temperature. After a few hours the separated coarse crystals are suctioned off and after having been recrystallized from ethanol they display a constant melting point of 140–141° C. with decomposition. Optical rotation $[\alpha]_D^{25}=+11.1°\pm1°$ (c.=4 in water).

Yield of O-benzyl-L-serine methyl ester-D-tartrate =75% of the theoretical.

A solution of 5 grams of O-benzyl-L-serine methyl ester-D-tartrate in 5 cc. of water is cooled to 0° C., 5 cc. of saturated potassium carbonate solution cooled to 0° C. are added and the whole is extracted twice with 50 cc. of ice-cold ethyl acetate on each occasion. The organic phases are washed with sodium sulfate solution until neutral, dried over sodium sulfate, combined and evaporated. The slightly yellowish oily residue is dried for 10 minutes in a water-jet vacuum with constant agitation at room temperature and then used for further reactions as it is. Yield: 95% of the theoretical.

EXAMPLE 9

*Tertiary butyloxycarbonyl-L-phenylalanyl-O-benzyl-L-serine*

A solution of 5.6 grams (12.3 mmols) of tertiary butyloxycarbonyl - L - phenylalanyl - O-benzyl-L-serine methyl ester in 15 cc. of methanol is treated with 15 cc. of N-sodium hydroxide solution and stirred for 30 minutes at room temperature. The solution is then concentrated to half its volume in vacuo at a bath temperature of 20° C. and extracted twice with ethyl acetate. The alkaline aqueous solution is acidified with 20 cc. of N-hydrochloric acid and once more extracted with ethyl acetate. The extract is washed neutral, dried, concentrated to a small volume and precipitated by adding petroleum ether. The precipitate is filtered off at 0° C., washed with petroleum ether and the residue is dried at room temperature in a high vacuum, to yield 5.08 grams of a white powder melting unsharply at about 65° C. After hydrolysis of the protective groups there appear in the systems 45 and 54 unitary spots which are identical with the hydrolysate of the analogous methyl ester.

EXAMPLE 10

*Tertiary butyloxycarbonyl - L-phenylalanyl-O-benzyl-L-acryl - L-prolyl-L-phenylalanyl-L-nitroarginine benzyl ester*

A mixture of 2.29 grams (5.2 mmols) of tertiary butyloxy-carbonyl-L-phenylalanyl-O-benzyl-L-serine, 2.20 grams (4.0 mmols) of L-prolyl-L-phenylalanyl-L-nitroarginine benzyl ester, 1.15 grams (5.6 mmols) of dicyclohexylcarbodiimide and 30 cc. of acetonitrile is stirred for 8 hours at 0° C. and then for 8 hours at 22° C. 0.25 cc. of glacial acetic acid is added, the mixture is stirred for 10 minutes at 22°, left to itself for one hour at 0° C. and the dicyclohexyl urea formed is filtered off. The filtrate is concentrated until it forms a viscid substance which is taken up in ethyl acetate, washed at 0° C. with dilute hydrochloric acid, sodium carbonate solution and water, then dried over sodium sulfate and evaporated. The crude product is preprecipated three times from ethyl acetate+petroleum ether and can be finally crystallized from the same solvent mixture in the form of fine needles. Including the amount obtained by working up the mother liquor the total yield amounts to 2.8 grams (=72% of the theoretical) of crystalline pentapeptide derivative melting at 105–110° C. After one hour's hydrolysis at 40° C. with concentrated hydrochloric acid the compound displays in system 54 an $R_f$-value of 0.74.

EXAMPLE 11

*L - phenylalanyl - O-benzyl-L-acryl-L-prolyl-L-phenylalanyl-L-nitroarginine benzyl ester*

1.84 grams of tertiary butyloxycarbonyl derivative are dissolved with heating in 10 cc. of absolute ethyl acetate, the solution is cooled to room temperature and treated with 25 cc. of 3.8 N-hydrochloric acid solution in ethyl acetate. The mixture is kept for 40 minutes, concentrated to a quarter of its volume and by adding 40 cc. of petroleum ether at 0° C. the pentapeptide benzyl ester dihydrochloride is precipitated quantitatively as an amorphous powder (1.85 grams).

The above product is dissolved in a mixture of n-butanol and saturated sodium bicarbonate solution, and the butanol phase is washed with water and evaporated to dryness. The resulting crude product is reprecipitated twice from ethyl acetate+petroleum ether, and yields 1.45 grams (88% of theory) of paper chromatographically substantially unitary material which is used for further working up.

EXAMPLE 12

*Carbobenzoxy - L - nitroarginyl-L-prolyl-L-prolyl-glycyl-L - penylalanyl - O-benzyl-L-seryl-L-prolyl-L-phenylalanyl-L-nitroarginine benzyl ester*

A mixture of 1.04 grams (1.73 mmols) of carbobenzoxy-L-nitroarginyl-L-prolyl-L-prolyl glycine, 1.25 grams (1.43 mmols) of L-phenylalanyl-O-benzyl-L-prolyl-L-phenylalanyl-L-nitroarginine benzyl ester, 380 mg. (1.85 mmols) of dicyclohexylcarbodiimide and 20 cc. of acetonitrile is stirred for 15 hours at 26° C. Finally 0.1 cc. of glacial acetic acid is added, the mixture is stirred for 15 minutes at room temperature and the reaction product is precipitated as a smeary substance by adding ethyl acetate and petroleum ether. It is dissolved in methanol, cooled to 0° C. and insoluble dicyclohexyl urea is filtered off. After having been repeatedly reprecipitated from methanol+ethyl acetate+petroleum ether the filtrate yields 1.54 grams (=74% of the theoretical) of an amorphous powder melting at about 130–140° C. which is used for further processing.

EXAMPLE 13

*L - arginyl - L-prolyl-L-prolyl-glycyl-L-phenylalanyl-L-seryl-L-prolyl-L-phenylalanyl-L-arginine acetate*

1.0 gram of carbobenzoxy-L-nitroarginyl-L-prolyl-L-prolyl - glycyl-L-phenylalanyl-O-benzyl-L-seryl-L-prolyl-L-phenylalanyl-L-nitroarginine benzyl ester is dissolved by gentle heating in 15 cc. of methanol, and the solution is treated with 4.1 cc. of N-aqueous hydrochloric acid and 400 mg. of palladium carbon (10% Pd) and hydrogenated with vigorous stirring at 35° C. under atmospheric pressure. After about 8 hours the absorption of hydrogen remains constant (126 cc.), and after a total of 16 hours the hydrogenation is discontinued. The catalyst is filtered off and the filtrate concentrated to 5 cc. For conversion to the acetate the concentrate is filtered through a column (18 cm. long, 12.5 mm. diameter) of a weakly basic ion exchanger resin in the acetate form and then again concentrated to about 10 cc. Lyophilization of this solution yields 861 mg. of a white, amorphous, hygroscopic powder. In systems 45 and 54 the substance displays unitary spots, $R_f=0.38$ and 0.58 respectively. However, on chromatography in system 56 separation into two approximately equally large spots of $R_f$ 0.66 and 0.71 takes place. The product is purified by being subjected to a Craig distribution between 0.4-molar ammonium acetate solution and n-butanol:

800 mg. of crude product are charged into two small tubes and distributed over 120 stages of 10 cc. each. By spot tests with Sakaguchi reagent two maxima are found:

$$Max._1 = 15; \quad K = 0.15.$$
$$Max._2 = 37; \quad K = 0.45.$$

The contents of the two tubes are combined and evaporated in vacuo at a bath temperature of 40° C. until a viscid residue is obtained. When the residue is inoculated with an ammonium acetate crystal it crystallizes practically completely. The remaining aqueous solution is freeze-dried with solid carbon dioxide and lyophilized. The resulting material (301 mg.) is a voluminous, white hygroscopic powder which on chromatography in all systems tried as well as in high-voltage electrophoresis proves to be pure. The nonapeptide is present in the form of the acetate (triacetate?). By total hydrolysis (20 hours at 105° C. in hydrochloric acid 1:1) the 5 different amino acids are formed in the theoretical proportions.

In the biological test on the intestine of the guinea pig the nonapeptide displays a threshold concentration of $1-2.10^{-9}$ g./cc.

What is claimed is:
1. Tertiary butyloxycarbonyl-L-prolyl-L-phenylalanyl-nitro-L-arginyl benzyl ester.
2. L-prolyl-L-phenylalanyl-L-nitroarginyl benzyl ester.
3. Tertiary butyloxycarbonyl-L-phenylalanyl-O-benzyl-L-serine methyl ester.
4. Tertiary butyloxycarbonyl-L-phenylalanyl-O-benzyl-L-serine.
5. Tertiary butyloxycarbonyl-L-phenylalanyl-O-benzyl-L - seryl-L-prolyl-L-phenylalanyl-nitro-L-arginine benzyl ester.
6. L-phenylalanyl - O - benzyl-L-seryl-L-prolyl-L-phenyl-alanyl-nitro-L-arginine-benzyl ester.

References Cited by the Examiner

UNITED STATES PATENTS 2,793,204  5/1957  Arens.
2,854,443  9/1958  Boissonnas.

OTHER REFERENCES

Fruton: Advances in Protein Chemistry, vol. 5, pages 21–33 and 62–64 (1949).
Konzett: Nature, vol. 188, page 998 (1960).
Silva et al.: Amer. J. Physiol., vol. 156, pages 261–273 (1942).

LEWIS GOTTS, *Primary Examiner.*
LEON ZITVER, *Examiner.*